US 6,650,762 B2

(12) United States Patent
Gibson et al.

(10) Patent No.: US 6,650,762 B2
(45) Date of Patent: Nov. 18, 2003

(54) TYPES-BASED, LOSSY DATA EMBEDDING

(75) Inventors: Jerry Don Gibson, Dallas, TX (US); Mark Gavin Kokes, Dallas, TX (US); Geoffrey Charles Orsak, Dallas, TX (US); Victor James Stolpman, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 10/143,959

(22) Filed: May 14, 2002

(65) Prior Publication Data

US 2003/0076245 A1 Apr. 24, 2003

Related U.S. Application Data

(60) Provisional application No. 60/294,268, filed on May 31, 2001, and provisional application No. 60/294,603, filed on Jun. 1, 2001.

(51) Int. Cl.[7] .................................................. G06K 9/00
(52) U.S. Cl. .................... 382/100; 713/176; 704/200.1; 704/219; 704/500; 704/502
(58) Field of Search ......................... 382/100; 723/176; 704/200.1, 219, 500, 502

(56) References Cited

U.S. PATENT DOCUMENTS

| | | | | |
|---|---|---|---|---|
| 5,319,735 A | * | 6/1994 | Preuss et al. ............... 704/205 |
| 5,659,726 A | * | 8/1997 | Sandford, II et al. ........ 707/101 |
| 5,881,172 A | | 3/1999 | Pintsov ....................... 382/277 |
| 5,940,135 A | * | 8/1999 | Petrovic et al. .............. 348/473 |
| 6,175,627 B1 | * | 1/2001 | Petrovic et al. ............... 380/42 |
| 6,226,608 B1 | * | 5/2001 | Fielder et al. ............... 704/229 |
| 6,289,486 B1 | | 9/2001 | Lee et al. ..................... 714/788 |
| 6,307,694 B1 | | 10/2001 | Du et al. ........................ 360/46 |
| 6,396,937 B2 | * | 5/2002 | Chen et al. .................. 382/100 |
| 6,427,012 B1 | * | 7/2002 | Petrovic ....................... 380/238 |

OTHER PUBLICATIONS

Kokes et al., "Spectral entropy-based wideband speech coding", Oct. 29, 2000, IEEE catalog No.: 00CH37154, vol. 2, pp. 1464–1468.*

Gibson et al., "Data embedding for secure communications", 2002, Milcom 2002, vol. 1 pp. 406–410.*

Csisazar, I. "The method of types [information theory]", Oct. 1998, 'Information Theory, IEEE Transactions on vol. 44, pp. 2505–2523.*

* cited by examiner

Primary Examiner—Michael Tokar
Assistant Examiner—Khai M Nguyen
(74) Attorney, Agent, or Firm—Oblon, Spivak, McClelland, Maier & Neustadt, P.C.

(57) ABSTRACT

A new approach to data embedding within ITU G.722 and ITU G.711 based upon the method of types and universal classification is disclosed. A secondary data sequence is embedded in the original (host) data stream using the method of types. The embedded data is extracted using a type-based universal receiver, with or without the use of a key. The choice of type and rate for the embedded data is based upon an analysis of portions of the original ITU G.722 or ITU G.711 coded data stream. The universal receiver learns the type from the received data alone, and hence, there is no side information required as in previous data embedding techniques. The embedding process and the receiver may both be data adaptive, so the original data stream can be reconstructed at the decoder without error.

41 Claims, 12 Drawing Sheets

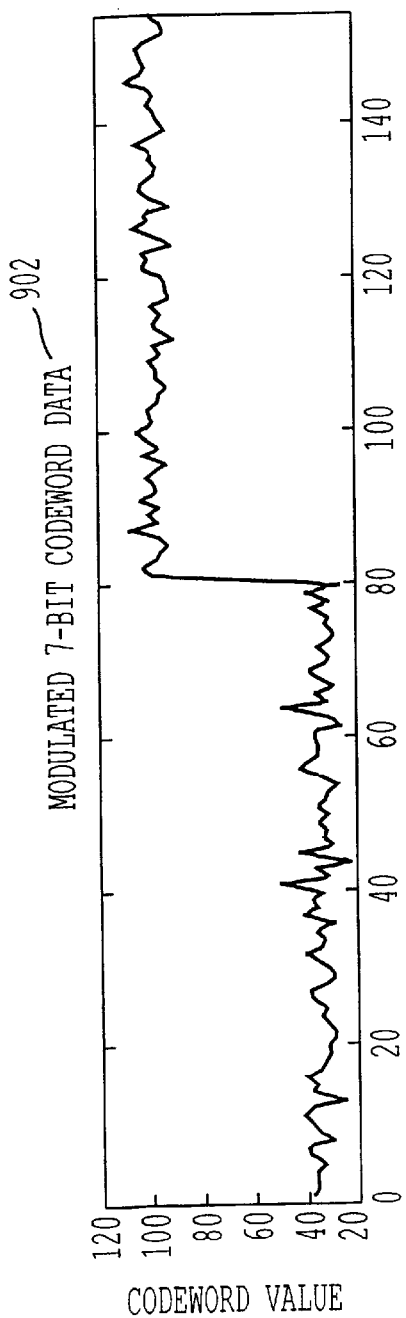
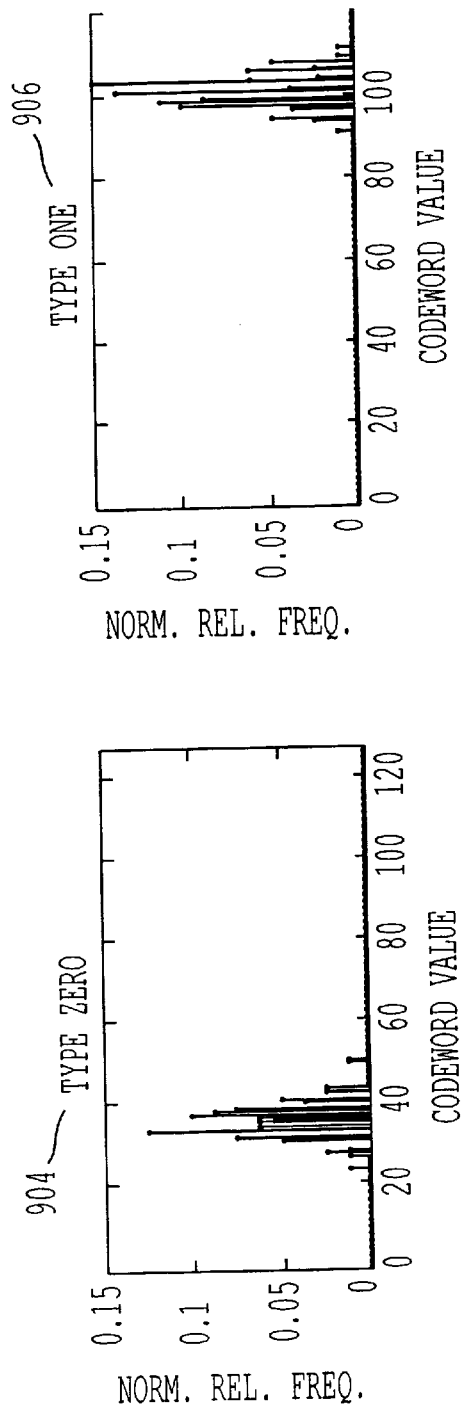
FIG. 3(a)
FIG. 3(b)
FIG. 3(c)

TYPES-BASED, LOSSY DATA EMBEDDING

CROSS-REFERENCE TO RELATED APPLICATIONS

This application claims the benefit of and priority to provisional application Serial Nos. 60/294,268, filed May 31, 2001, and 60/294,603, filed Jun. 1, 2001, each of which is incorporated herein by reference in their entirety.

STATEMENT REGARDING FEDERALLY SPONSORED RESEARCH

The U.S. Government has a paid-up license in this invention and the right in limited circumstances to require the patent owner to license others on reasonable terms as provided for by the terms of Grant Nos. NCR-9796255 and CCR-0093859 awarded by the National Science Foundation (NSF).

BACKGROUND OF THE INVENTION

1. Field of the Invention

This invention relates generally to systems, methods, and computer products for data embedding.

2. Discussion of the Background

The present invention relates to technologies referenced and described in the references identified in the appended APPENDIX and cross-referenced throughout the specification by reference to the number, in parentheses, of the respective reference listed in the APPENDIX, the entire contents of which are also incorporated herein by reference.

The field of information hiding contains several subfields, including steganography, where a message is concealed in another data stream, and watermarking, where ownership data is included in a digital object to be protected. A third subfield of information hiding is the field of data embedding, wherein additional information is incorporated in the transmitted data stream by using a key and distorting (slightly) the original object. The embedded information cannot be reconstructed without the key.

Over the last decade, and concurrent with the growth of the Internet, digital media has sprung to the forefront of consumer interest. Already offering several distinct advantages over its analog counterpart, digital media has presented itself more recently as a candidate for yet another new technology, data embedding. Data embedding, as its name implies, suggests that digital information (i.e. data, text, audio, or video) can be inserted into the content of another digital signal (i.e. data, text, audio, or video).

To date, there are numerous applications for data embedding. One of the most important applications is copyright protection of digital information. In the business sector, there is growing interest in a reliable, transparent mechanism to identify ownership and distribution channels for particular digital data sequences. In addition, many distributors of digital content are also looking for a cost effective solution for the transport of various control, reference, and descriptive signals which in turn can be used to differentiate as well as track access to their products and services. Many believe that data embedding is the answer to these proposed problems. One application, which is synonymous with data embedding, is the communication of secondary data sources through so-called covert channels. In this scenario, data embedding algorithms are used to securely hide relatively small amounts of potentially encrypted (i.e. secret) information within a host digital signal.

Most of the background art in the area of data embedding has concentrated on image and video applications. In the following, audio data embedding background art is summarized and commented on.

Scalar quantization refers to a process of identifying a number of contiguous value ranges within a data set sufficient to accommodate all data values within the data set, assigning integer values to each value range, and then replacing each datum with an integer corresponding to the value range in which the datum's value was found. Quantization requires a selection of the size of each value range, or "bin."

One of the first data embedding techniques used was least significant bit replacement. (See references (6)–(7)). Such techniques lead to problems as the precision of the host signal decreases toward 1 bit/sample. Other techniques have been devised based on a phase coding approach. (See reference (8)). In these algorithms, the phase of the Fourier transform coefficients of a frame of the host signal is altered in a meaningful way. Echo coding has also been proposed for audio data embedding. (See reference (8)). In this method, multiple decaying echoes are placed in the spectrum of the host signal such that by using cepstral analysis, one can locate and decode the nature of the embedded symbol. Many spread-spectrum approaches have also been proposed for audio data embedding applications. (See references (8)–(13)). Some authors propose embedding information as spread-spectrum (i.e. "colored") noise. Several other methods (see references (14)–(16)) use spectral component replacement to embed data transparently into digital audio signals. Even simpler techniques have been attempted where signal peaks are modified within a segment of host audio in order to force the signal to fall within embedded data-specified quantization ranges. (See reference (16)). In this way, the embedded information is surmised by observing trends in the quantization patterns of the host signal.

Many of these techniques are already present in commercial products. The common factor among most of these techniques, is that they are limited in their ability to achieve significant embedded throughput. Background art techniques achieve embedded bitrates of 8–50 bps with corresponding error rates in the embedded bitstream between $10^{-3}$ and $10^{-2}$. (See references (8)–(16)).

SUMMARY OF THE INVENTION

The present invention has been made in view of the above-mentioned and other problems and addresses the above-discussed and other problems.

The present invention includes a types-based, lossy data embedding encoder and decoder, which may function independently, and a system including both a types-based, lossy data embedding encoder and a types-based, lossy date embedding decoder. As used herein, a "type" (i.e. empirical histogram) captures the essential statistical properties of a given data sequence.

The types-based, lossy data embedding encoder includes a data precision module and a data embedding module. The data precision module determines the number of bits to embed in an input (host) data stream, where the input data stream could be, for example, an ITU G.711 or G.722 data stream, or alternatively, the number of bits to be embedded may be fixed. The data embedding module is coupled to the data precision module and receives a secondary data input, which may be user data or other data, and modulates the type of the data stream according to the secondary data symbol to be transmitted and the precision of the secondary data. The method used by the types-based, lossy data embedding encoder to encode data in a data stream includes framing input code words, mapping the framed code words into base master types, determining the number of bits to be embedded, forming secondary bit sequences into embedded data symbols, and modulating a frame based on the embedded data symbols and current frame type.

The types-based, lossy data embedding decoder includes a data precision module which determines the number of bits embedded in an incoming data stream, and a data extraction module coupled to the data precision module which produces a secondary data output by demodulating the data frame input to produce a secondary data symbol and a secondary data bit precision by determining the secondary data symbol using M-ary hypothesis testing of the input data frame. The host data stream could be, for example, an ITU G.711 or G.722 data stream. The types-based, lossy data embedding decoder decodes the host data stream by framing the received code words, adaptively determining the number of bits that are embedded in the host data stream, demodulating the frame based on the embedded data symbols and on the current frame type, reverse mapping the base master types into framed code words, and forming embedded data symbols into secondary data bit sequences.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a)–3(c) illustrate an exemplary "type" according to the present invention.

DETAILED DESCRIPTION OF THE PREFERRED EMBODIMENTS

A novel approach to data embedding, within the ITU G.722 standard (see reference (1)) and within the ITU G.711 standard (see reference (25)), and based upon the method of types and universal classification, is disclosed. The ITU G.722 standard, the ITU G.711 standard, and all related references and all references cited therein are incorporated herein by reference in their entirety. In the present invention, a secondary data sequence is embedded in the original (host) data stream using the method of types. The embedded data is extracted using a type-based universal receiver, without the use of a key. The choice of type and rate for the embedded data is based upon an analysis of portions of the original coded data stream. The universal receiver learns the type from the received data alone, and hence, there is no side information as in previous data embedding techniques. The embedding process and the receiver may both be data adaptive, so that the tradeoff between embedded data rate and errors in the reconstructed host data can be specified by the user.

Figure 1:
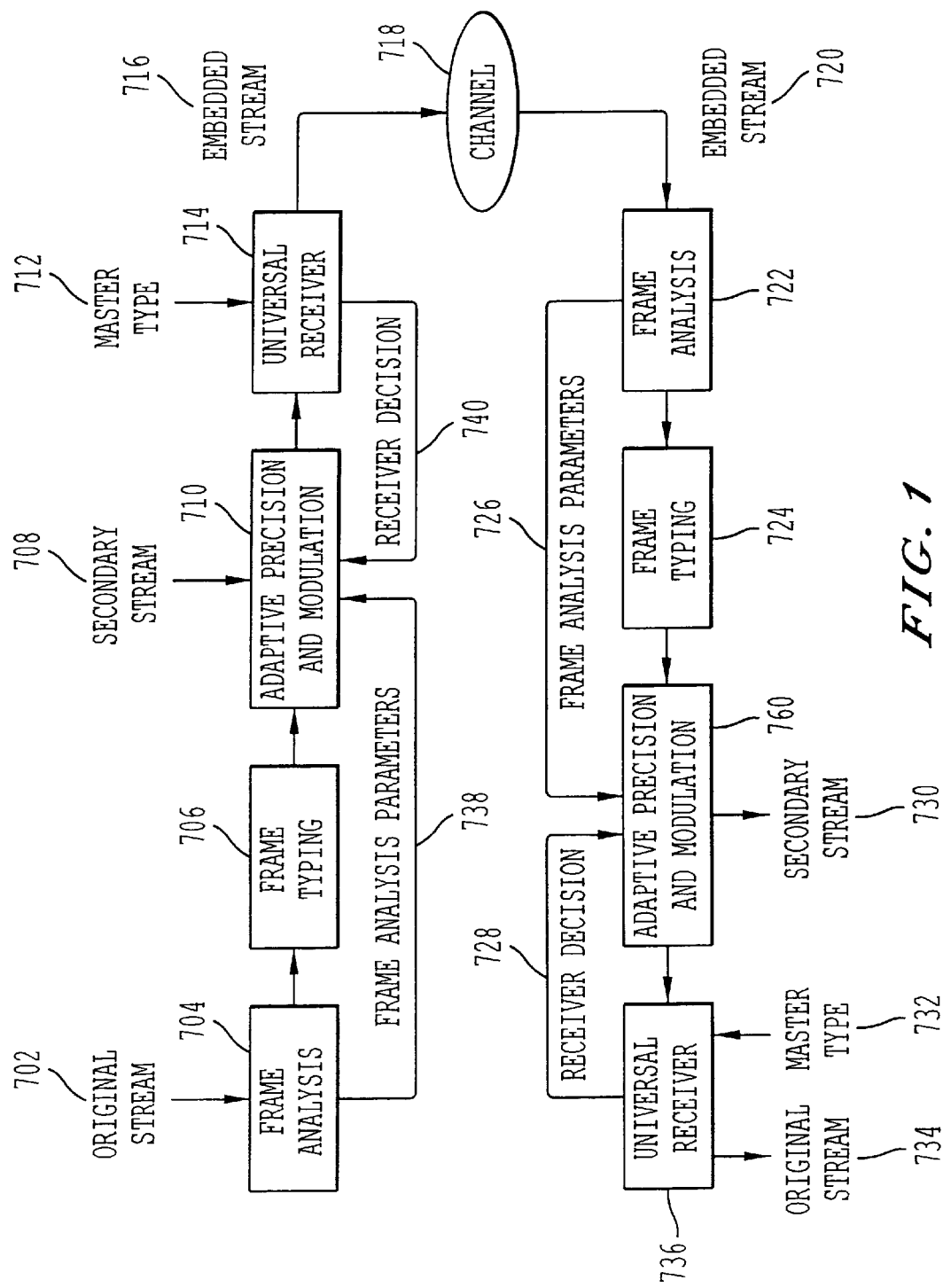
FIG. 1 is an exemplary data embedding system block diagram according to the present invention.

Referring now to FIG. 1, the underlying principles of this new data embedding scheme lie in work based on universal receiver 714 and classifier design. Similar to the wireless communications problem, embedding data into digital signals can be thought of as transmitting information 716 over a communication channel 718 that is corrupted by strong interference and channel effects. Such a model for the case of a binary communication system is given as, $$H_0: \gamma(t)=s_0+\eta(t), \text{ Symbol "0" Transmitted} \quad (1)$$

$$H_1: \gamma(t)=s_1+\eta(t), \text{ Symbol "1" Transmitted}$$

In this model, a data symbol is hypothesized (i.e. $H_x$) to be transmitted from one of two sources. The binary data symbol to be transmitted, $s_x$, corresponds to the data symbol that is to be embedded into the host signal, $\eta(t)$. The strong interference is representative of the host signal. Channel effects correspond to any pre- or post-processing done to the combined signal (i.e. $\gamma(t)=s_x+\eta(t)$).

The present inventors' novel method is to apply universal classification techniques toward embedded bit detection using an M-ary hypothesis testing procedure. Note that the statistical properties of the host signal vary significantly from frame-to-frame and thus in order to achieve reliable detection of embedded content, it is useful have a detector which is robust to the changing characteristics of both the host and embedded signals. By using the method of types and an information theoretic distance measure, the minimum distance between observed empirical data distributions and distributions based on training data sequences of sufficient length is looked for. In the method of the present invention, the minimum distance between the empirical distribution of the test data sequence and that of the M empirical distributions derived from the training data sequences indicate the presence of one particular type of embedded symbol.

In the apparatus and method of the present invention, some observed empirical distributions of host signal frames can be quite different from any empirical distribution derived by observing the host signal over a long period of time. This could lead to a false detection of embedded symbols at the decoder. If this happens, it is sometimes possible to adapt the embedding scheme to counteract such events. At other times, it is difficult to alter the content of a segment in a way that can be surmised by the decoder and produce the correct embedded symbol at the decoder without affecting the original content of the data frame. In these cases, the method of the present invention may incur embedded bit detection errors. In any event, the decoder is intelligent enough to adapt to the changing characteristics of both the host and embedded signals while working with only limited knowledge (i.e. with knowledge of only the combined signal, $\gamma(t)$). Using this algorithm, the probability of getting an unworkable frame of data decreases as the frame-size of the data segment increases. Consequently, as the size of the data frame increases, the rate at which data can be embedded into the host signal decreases. Thus, there is a tradeoff that is balanced in order to achieve the desired data embedding goal (i.e. maximized embedded throughput with minimal error probability).

With the general principles of the present inventors' data embedding approach stated, examination is now made of the mathematical building blocks of the novel method, according to the present invention, for embedding information into digital audio signals.

The data embedding problem is transformed into a signal classification problem that can be cast as a M-ary hypothesis testing problem in which each hypothesis represents a different random source from which it is assumed any one embedded symbol is derived. It is noted that the channel model (i.e. η(t)) is rarely ever stationary and thus it varies with time depending on the characteristics of the host signal. Thus, there is an inherent need to use an adaptive detector to extract the embedded information. If the channel model could somehow be parameterized, then the General Likelihood Ratio Test could be used to detect the embedded content. However, such a solution produces mediocre results at best. (See reference (17)).

The present inventors disclose herein how to solve the problem of robust detection of the embedded content. It has been shown that under general circumstances, type-based detectors have asymptotic performance measures comparable to those of the clairvoyant detector. (See references (18)–(19)). The type characterizing the various hypotheses can be estimated from only the sample (i.e. observed) data. Because the optimal clairvoyant detector depends only on the true probability distributions, it is apparent that empirical histograms (i.e. types) are calculated from training data and compared to the empirical histogram of the observed test data in order to differentiate between hypotheses. When faced with classifying observed data frames based on the training data types, optimal performance is not guaranteed by merely calculating the empirical likelihood ratio. (See reference (18)). Rather, it has been shown that better performance can be obtained by concatenating the training data for each hypothesis with the observed test data. (See reference (17)). How different the type derived from these longer sequences is from the types of: (a) the training data, and (b) the observation, can be assessed by utilizing the Kullback-Leibler distance measure. The rather surprising form of the hypothesis test leads to an exponential increase in the probability of detection with increased numbers of observations (i.e. samples of test data). Moreover, with the definition of a rejection region, the decay rate can be controlled by the user. Furthermore, it has been shown that no detector based solely on the test and training data sequences has a larger asymptotic rejection probability decay rate for the same exponential error decay rate. (See reference (19)). This result implies that with increasing numbers of test data samples, the type (i.e. empirical histogram) of the observed test data frame is more likely to be (less likely not to be) differentiated from any one of the M types derived from the training data.

Consider the following M-ary hypothesis testing problem:

$$H_0: \quad X^n \sim P_1 \quad \text{Source 1} \tag{2}$$
$$H_1: \quad X^n \sim P_2 \quad \text{Source 2}$$
$$\vdots \quad \vdots \quad \vdots$$
$$H_M: \quad X^n \sim P_M \quad \text{Source M}$$
$$H_{M+1}: \quad \text{Rejection Region}$$

where the test vector $X^n$ is of length n. It is assumed that under hypothesis $H_i$, the test vector, $X^n$, is generated by a source with probability measure $P_i$ (unknown to the detector). In addition, due to the absence of an accurate statistical model for the M sources, it is assumed that there exist training vectors $T_i^N$, i=1,2, ... M of length N from each of the M possible data sources. Therefore, the classification between source types is made on the basis of the test vector, $X^n$, and the training vectors, $T_1^N$, i=1,2, ... M.

The mathematical quantities used to differentiate the correct source density from those which lead to false detections of embedded data symbols are now further disclosed. It has been shown that the asymptotically optimal Generalized Likelihood Ratio Test (GLRT) for determining if a finite alphabet test sequence, X, arose from the same source as a finite alphabet training sequence, $T_1^N$, is:

$$h_i(X, T_i) = \frac{1}{n} \log \left\{ \frac{\sup_{Q_1, Q_2} Q_1(X^n) Q_2(T_i^N)}{\sup_Q Q(X^n, T_i^N)} \right\} \tag{3}$$

where $Q_1$, $Q_2$, and Q denote source densities. (See reference (20)).

From an intuitive point of view, it can be seen that if the data sequences $X^n$ and $T_i^N$ arise from the same source, then $h_i$ will converge to zero in the limit. Alternatively, if the data originated from different sources, then $h_i$ will converge to some constant greater than zero which will allow for discrimination between the proposed M hypotheses. It was originally shown by Gutman (see reference (19)) for the classification problem that this test offers asymptotically optimal performance over a very wide range of source statistics.

Due to the requirement of the supremum calculations in (3), the detector is not practical to implement. However, through the use of the method of types, the log-likelihood ratio is reduced to $$h_i(X, T_i, \lambda) = d_{KL}\big(Q_{(X^n)}, Q_{(X^n, T_i^N)}\big) + \frac{N}{n} d_{KL}\big(Q_{(T_i^N)}, Q_{(X^n, T_i^N)}\big) - \lambda \tag{4}$$

The quantities, $Q_{(T_i^N)}$, $Q_{(X^n)}$, and $Q_{(X^n, T_i^N)}$ represent the types of the data vectors, $T_i^N$, $X^n$, and the concatenated vectors ($X^n$, $T_i^N$). These types represent the empirical (histogram) estimates of the statistics and joint statistics of the data vectors. The distance metric is the functional $d_{KL}$, the well known divergence or relative entropy between the probability mass functions in its argument. $\lambda$ is a positive constant chosen to satisfy some design criterion (i.e. rejection region). In addition to the above, the present inventors disclose an alternative interpretation in terms of the entropies of the types, $$h_i(X, T_i, \lambda) = \frac{N+n}{N} H\big(Q_{(X^n, T_i^N)}\big) - H(Q_{(X^n)}) - \frac{N}{n} H\big(Q_{(T_i^N)}\big) - \lambda \tag{5}$$

The above expression for the discriminant function in terms of the entropies is computationally preferable for on-line processing, as the entropies of the training sequences can be pre-computed. Note that the joint type of $X^n$ and $T_i^N$ in terms of the marginals is defined as $$Q_{(X^n, T_i^N)} = \frac{n Q_{(X^n)} + N Q_{(T_i^N)}}{n+N} \tag{6}$$

With only a few general assumptions, the type based detector of the present invention has been shown to have asymptotic performance measures comparable to those of the clairvoyant detector. (See reference (17)). In addition, in (see reference (21)), the behavior of the type-based detector of the present invention relative to the amount of training data used has been explicitly shown. These demonstrations provide evidence that the type-based detector of the present invention can in fact achieve globally optimum performance even with limited amounts of training data. These results are particularly applicable to the experiments conducted by the present inventors.

Returning now to FIG. 1, an exemplary embodiment of the present invention that features ITU G.711 is now described.

Since the present approach is data-adaptive, each sequence of host data 702 is analyzed to determine if an embedded data stream 708 can be accommodated without substantially compromising the host data 702. Thus, the present classification problem is the M-ary hypothesis problem with rejection (see reference (18)), where the rejection zone is used for the "no embedded data" case. The number of bits embedded per host data sequence is $\log_2\{M\}$.

Because it is advantageous not to send any side information, the first issue addressed by the present invention is determining under what conditions can an embedded data stream 708 be successfully decoded from the received data stream 720. More specifically, if $\log_2\{M\}$ bits are embedded in the host sequence 720 such that the probabilities of falsely decoding embedded hypothesis $H_i$ as one of the other hypotheses, $H_j$ (j=1,2, . . . , M, j≠i), exponentially decreases in n (the host data sequence length) with parameter λ, the following holds for the probability of correctly decoding under the M hypotheses. From (see reference(18)), it is known that if the training sequence N is of insufficient length with respect to n, then there exists an hypothesis $H_j$ such that the probability of choosing rejection given $H_j$ (decoding no embedded data given $H_j$) approaches 1 as n→∞. However, for a sufficiently long training sequence (length N) with respect to n as n→∞, the probability of choosing the rejection region under $H_j$ is bounded away from 1.

Since the method of the present invention is host data sequence adaptive, these results imply that by adaptively varying the number of bits embedded ($\log_2\{M\}$) per host sequence, the receiver will be able to track the data embedding process at the encoder with high probability, and without the transmission of side information.

A second issue addressed by the present invention concerns modifying the data type of the host data such that data can be embedded and in such a way that the receiver can determine the modified data type from the received data stream 720 only; that is, without side information. For a given host data sequence 702 to be transmitted, the case is considered where the minimum entropy data type is determined and this minimum entropy data type is modified by shifting within the region of support of the class of data types. Justification for selecting the minimum entropy data type as the type to be modified will be made clear by the following disclosure. The process of data embedding via simple shifts of this type is analyzed. Note that the number of shifts corresponds to the number of hypotheses that must be detected with the universal receiver. Only symmetrized, unimodal type classes will be considered in this development.

It is known that the optimal likelihood ratio test from the Neyman-Pearson lemma can be written as the difference between two relative entropies (see reference (2)). Thus, if data is embedded by shifting the symmetrized data type, the number of hypotheses that can be distinguished will be dependent upon the spread of the type class and on the region of support. For M=2, there are three different errors that can occur: (i) Given that $H_1$ or $H_2$ has been sent, the detector may decide "no embedded data" and reject both; (ii) Given that $H_1$ is sent, the detector decides $H_2$; and (iii) Given that $H_2$ is sent, the detector decides $H_1$. Stein's lemma discloses that one of these error probabilities can be fixed at some suitably small value and the others can be made to approach zero exponentially with respect to the relative entropy between hypotheses (see reference (2)). However, in the present situation, all of these errors may be of equal significance. What is needed is to select the shifts of the minimum entropy data type to obtain equal probabilities of making an error given that any hypothesis or the "no data" case is sent. Thus, a Bayesian approach can be used with specified a priori probabilities on the hypotheses, say $\pi_1$, $\pi_2$, and $\pi_R$, and Sanov's Theorem can be used to bound the error probabilities with respect to the nearest neighbor regions (see reference (2)). Once the minimum entropy type has been determined, data can be embedded by constructing hypotheses other than shifts of this data type (see reference (29)). These cases are also being investigated by the present inventors.

A feature of type-based data embedding is that it is a lossy approach. By removing the many constraints (i.e. perceptual) in the typical data embedding problem, information can be embedded in a host signal in such a way that the throughput of the channel is increased without also increasing the transmitted data rate. In order for the present invention to achieve this additional throughput, a small number of errors in both the original and embedded streams are accepted, as long as these errors do not significantly affect the quality of the original data stream. A feature of this approach to data embedding is that it is not concerned with attacks or secret key information. By these means the present invention may thereby achieve advantageous throughput enhancement.

In this section, detailed disclosure is provided regarding the asymptotic analysis disclosed in the previous sections. The present inventors disclose results regarding the relations between the lengths of the training sequences (N), the lengths of the host sequence (n), and the number of bits embedded in a particular host frame ($\log_2\{M\}$). The present inventors disclose the amount of distortion associated with making errors in detecting the correct embedded precision and symbols, and also disclose ways to compensate for such errors.

Figure 2A:
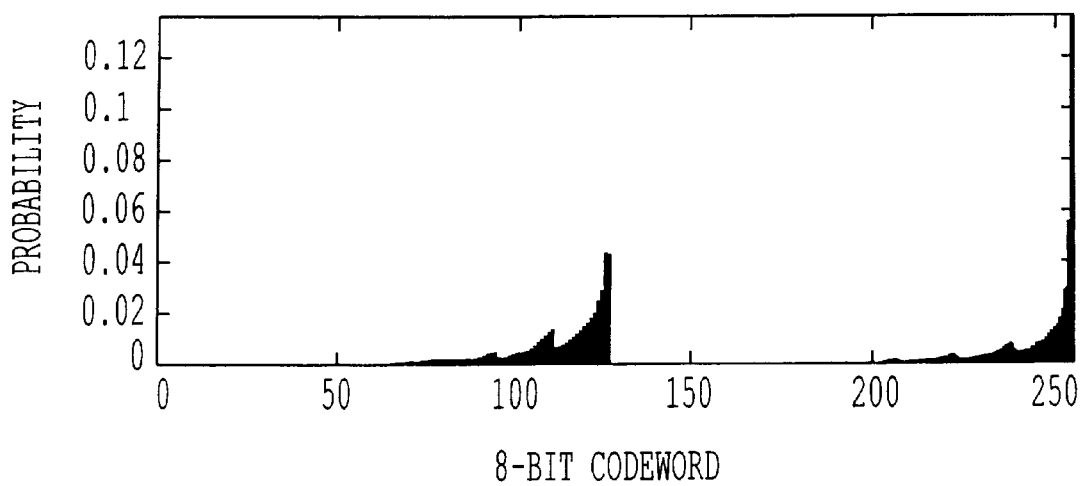
FIGS. 2(a) and 2(b) depict examples of codeword histograms according to the present invention.
Figure 2B:
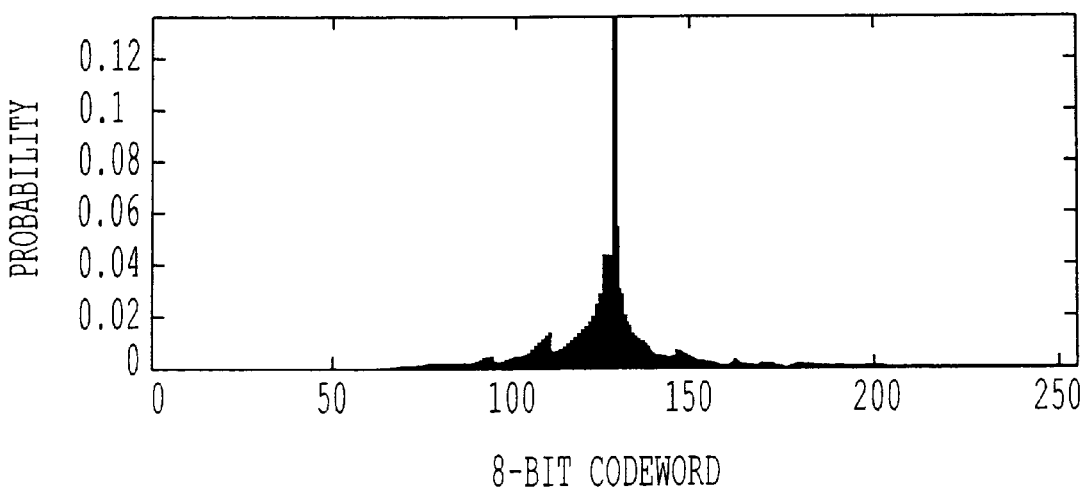

To begin the data embedding process, it is advantageous to have an understanding of the master type inherent within the original data stream. The master type for G.711 is shown in FIG. 2. This type can be ascertained by observation of a typical G.711 codeword sequence over a reasonable amount of time. The resulting data type often requires some sort of 1:1 mapping in order to obtain the uni-modal characteristic that is conducive to minimal error detection using a shift-based modulation/embedding scheme. This information is useful to the detection process for it is shifted versions of the master type that are used to comprise the training data types.

The amount of time over which to formulate a master type is estimated as follows. In (see reference (21)), Stolpman suggests that β range from $10^3$ to $10^4$ (i.e. β=N/n, the ratio of the length of the training data sequence to the length of the data sequence). Outside of this range there is typically no additional gain in performance for a particular master type. Recall that n is directly proportional to the embedded data rate for a given sequence. In the present invention, the present inventors follow these predetermined guidelines for master type construction. Experimenting with these results, the present inventors verified that, on average, increasing β did not significantly affect the detection performance of the embedding system.

Embedded rates and embedded error rates influence frame processing length. In the trials described in the present disclosure, n ranges from 4 to 30 depending on the target embedded data rate. For higher target rates, the value of n should decrease. In these trials, the value of n is held constant over the particular speech segments being processed. Exemplary embodiments of the present invention include altering n on a frame-by-frame basis via voice activity detection (VAD) or using a simple spreading measure on the current data type to determine an appropriate value of n for best probability of detection. In any case, the value of n will depend on the variance of the master type produced from the source compression algorithm from which the original data stream is being generated.

Determining the number of bits to embed on a frame-by-frame basis contributes significantly to the overall average data rate achievable for a particular speech segment. In the previous section, it is disclosed that the receiver is able to track the data embedding process at the encoder/decoder (i.e. decoding is present at the encoder) with high probability, and without the transmission of side information. This is made possible by the use of an intermediate type, which the present inventors call the minimum entropy type (MET). This data type can be formulated at both the encoder and decoder and is shift invariant. The property of shift (i.e. modulation) invariance is fundamental to the calculation of this data type. According to the present invention, an entropy measure and thresholding procedure on this intermediate type is used to determine the number of bits to be embedded in the current data frame.

Of interest to those skilled in the communication art is the achievable embedded rates and error rates associated the above mentioned process. Table I demonstrates results according to a host data adaptive version of the present invention from G.711 trials for 30-second speech samples simulating typical human conversation. The present inventors show that up to an additional 2% (i.e. 1.5 Kbps) of the host stream can be embedded while maintaining a minimal effect on the original data. Errors in the host stream sound click-like in nature and are instantaneous in the sense that they do not linger on in time. This is due to the insignificant delay associated with G.711 speech coding. It is likely that such errors in the host stream can be corrected by the introduction of a slight delay in the data embedding decoder. Such corrections in the host data stream can be accomplished because of the time domain waveform following nature of the G.711 codec. The corrected host stream can then be utilized to adjust for any additional errors detected in the embedded stream as well. This additional processing could significantly further lower the error rates associated with both the embedded and host data streams and consequently allow an increase in the embedded rates for a desired probability of error.

TABLE I

Average Embedded Data and Error Rates for G.711

| Embedded Data Rate | Embedded Error Rate |
|---|---|
| 1.5 Kbps | $10^{-4}$ |
| 3.2 Kbps | $10^{-3}$ |
| 9.6 Kbps | $10^{-2}$ |

Table II shows G.711 data embedding results for the present invention when the number of embedded bits per frame is fixed, for two different frame lengths. It is observed that as the frame length is shortened, the embedded data rate can be increased, but at the cost of an increased error rate. Experiments have shown, however, that all errors indicated in the table are easily correctable by a simple postprocessing scheme.

TABLE II

G.711 Data Embedding Demo

| Timit Speech Sequence (#) | Embedded Rate (1.6 Kbps) Framesize = 25, $P_{fe} \approx 0.001$ Frame Errors/Frames/$P_{fe}$ | Embedded Rate (4.0 Kbps) Framesize = 10, $P_{fe} \approx 0.01$ Frame Errors/Frames/$P_{fe}$ |
|---|---|---|
| Male 1 (1903) | (4/849/0.00276) | (48/2124/0.0226) |
| Male 2 (0643) | (2/1001/0.00199) | (58/2503/0.0232) |
| Male 3 (0103) | (3/1001/0.00299) | (37/2503/0.0148) |
| Female 1 (1559) | (3/1087/0.00276) | (45/2718/0.0166) |
| Female 2 (2189) | (2/1087/0.00184) | (37/2718/0.0136) |
| Female 3 (0929) | (2/1087/0.00184) | (36/2718/0.0132) |

Notes:
[1] $P_{fe}$ = Probability of Frame Error. No Consecutive Frame Errors.
[2] Output bitrate is 64 Kbps.
[3] Demo: Original/Reconstructed/Corrected Waveforms.

A novel technique is herein disclosed for embedding information into an International Telecommunications Union G.722 (see reference (1)) digitally compressed audio signal. ITU G.722 is a split-band audio codec which operates at 48, 56, or 64 Kbps. The input signal to the codec is a 16-bit, 16 KHz digitally sampled audio waveform. The codec filters the input signal using a quadrature mirror filterbank to split the audio signal into two subbands (0–4 KHz and 4–8 KHz). The individual subband signals are then compressed using adaptive differential pulse code modulation (ADPCM). In the low frequency content band, the ADPCM compression is achieved by using 4, 5, or 6 bits per codeword. In the upper band, compression is achieved by using 2 bits per codeword. The aggregate rate of the two compressed subband signals total the output bitrate of the codec. With knowledge of the ITU G.722 compression scheme and insights into the principle theories of universal receivers and the method of types (see references (2)–(3)), the present invention for data embedding within G.722 is further disclosed below.

According to the background art, a "type" (i.e., an empirical histogram) captures the essential statistical properties of a given data sequence. Turning now to FIG. 3, FIG. 3 depicts, according to the background art, example types for modulated 7-bit codeword data 902, where the codeword value from time sample numbers 0–80 is evaluated as type zero 904, and the codeword value from time sample numbers 80–160 is evaluated as type one 906.

In general, the data embedding apparatus and method of the present invention includes the following conceptual steps. (See references (4)–(5)). The host data stream to be transmitted is analyzed off-line to determine the data types that commonly occur. Modifications to these types are then determined that can be used to send the embedded data symbols and that can be accurately detected by type-based universal receivers at the decoder. Then, for each individual frame of host data to be transmitted, the data type is modified in such a way to represent an embedded data symbol. The universal receiver operates on the received data stream and extracts the data type that represents the embedded symbols. The embedded stream is then decoded and sent to the user. After removing the modifications to the received data sequence due to the embedded stream, the host data can be decoded using a standard G.722 decoder.

Two features absent from previous work in data hiding and present in the disclosed invention is that the present invention does not seek to hide the embedded data from other users, and the present invention features that the original data stream may be decoded with errors. The overall goal of the embedding scheme herein disclosed is to increase the effective received data rate without increasing the transmitted data rate. By suitable choice of the encoded types with respect to each data frame, the embedded data stream can be decoded essentially error free. The conceptual steps of the present invention are as follows.

The host stream to be transmitted is analyzed to determine possible inherent data types. Modifications to these types are established which can be used to transmit the embedded data. It is advantageous that these modifications be accurately detectable by a type-based receiver. For each frame of host data, the data type is modified in such a way to represent the embedded content. A universal receiver operating on the received data extracts the type representing the embedded symbol and both streams are processed and sent to the user.

The minimum entropy typing (MET) process occurs at both the data embedding encoder and decoder. This process ensures that the encoder and decoder converge on the embedded bit precision determination. The input to the MET process is a mapped type. This mapping occurs in the stage previous to the MET module. A near-unimodal characteristic is typical of the type passed to the MET module. Multimodal types may be also used at this point in the process. Note that modes in this case correspond to peaks in the empirical probability density function (PDF), i.e. type, for a particular frame of data. The input to the MET module is a type of length N samples.

Minimum entropy type processing begins with a symmetrization step. Using the N-sample input type to the MET module, processing begins by symmetrizing this type. This step effectively doubles the amount of data present in the formulation of the type (i.e. empirical histogram for a particular frame of data).

After symmetrization, the resulting symmetric type is resealed so as to maintain the characteristics of a proper statistical PDF (i.e. sums to 1). Next, the new symmetric type is convolved with itself The resulting convolved type will have a length of 2N−1 samples. Using a rectangular window of unit magnitude and of length N samples, the first N samples of the convolved type are extracted and the entropy of this N-sample segment is calculated and stored. Using the same procedure, the rectangular window is slid over one sample and the entropy of this next N-sample segment is calculated and stored. This process is repeated for all possible N−1 distinct N-sample sequences in the convolved type.

At the end of this stage, the result is a list of N−1 entropy values. To determine the minimum entropy type, the N-sample sequence that yields the minimum entropy value (from the stored list) is selected. This segment can then be extracted using the proper rectangular window placement.

The minimum entropy type has to be resealed so that it maintains the characteristics of a proper statistical PDF (i.e. sums to 1). After rescaling, the entropy of this new type is re-calculated. The resulting entropy value is then used to obtain the embedded bit precision from a lookup table relating numerous entropy observations from the particular host data source in use. It should be noted that a feature of this process is the determination of a type, with a known origin, at both the encoder and decoder.

The encoder works on the original mapped type while the decoder works with the data type corresponding to the original host frame with the embedded information already in place (this implies a modulated/shifted type when compared to the original type know to the encoder). Note also that the resulting minimum entropy type may be offset from center (typically no more than 2 bins in either direction). Correction for this offset may be performed in the detection process at the decoder depending on the determined bit precision for the current data frame. For lower precisions (i.e. <4 bits/frame), this correction step may be omitted.

However, for higher precisions, in order to detect the correct embedded symbol, this correction may be taken into account. In this case, an additional modulation/shift may reset the origin of the selected grid system (previously set by the precision determination).

Figure 4A:
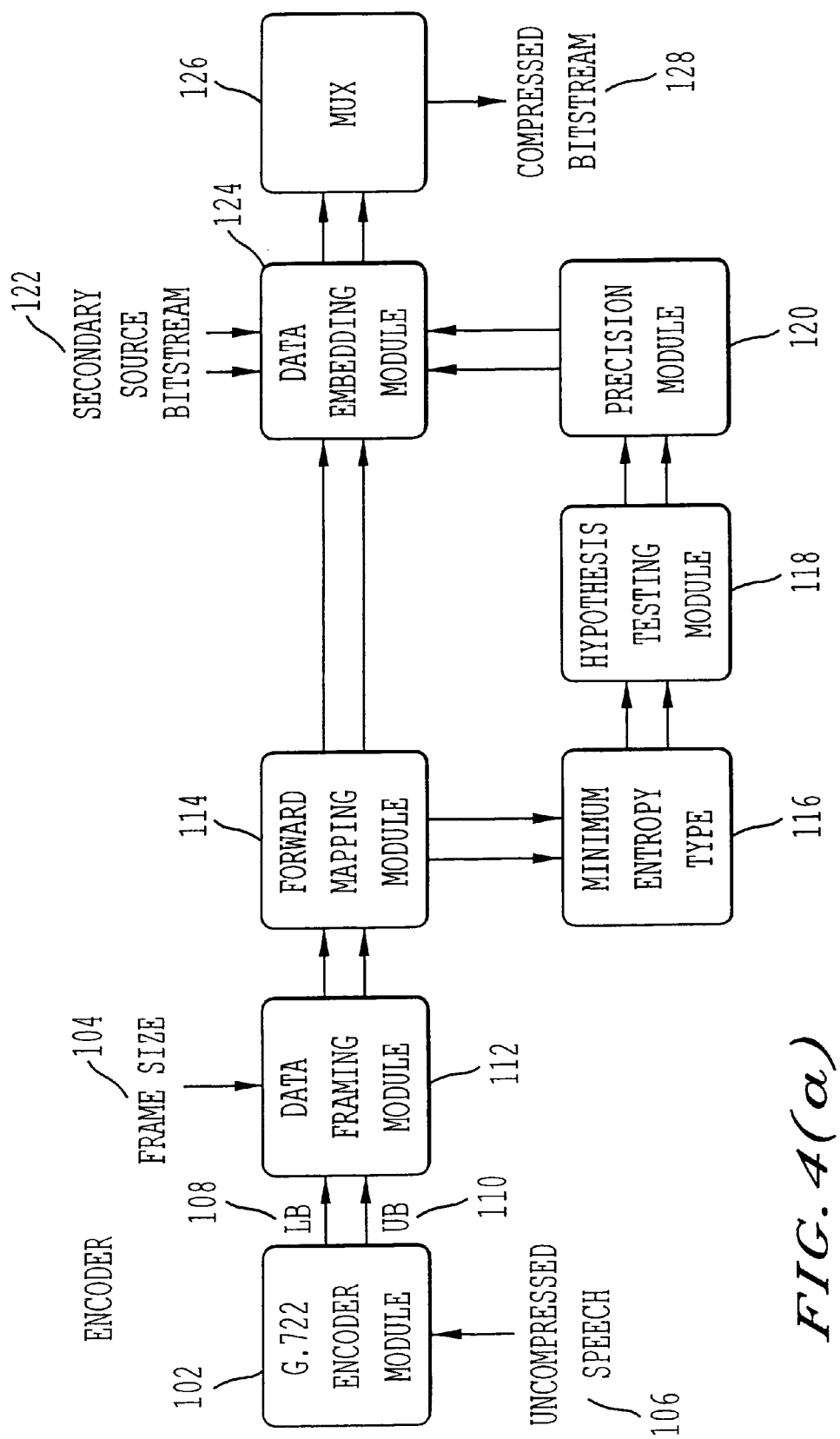
FIGS. 4(a) and 4(b) are block diagrams for an example data embedding encoder and decoder pair according to the present invention.
Figure 4B:
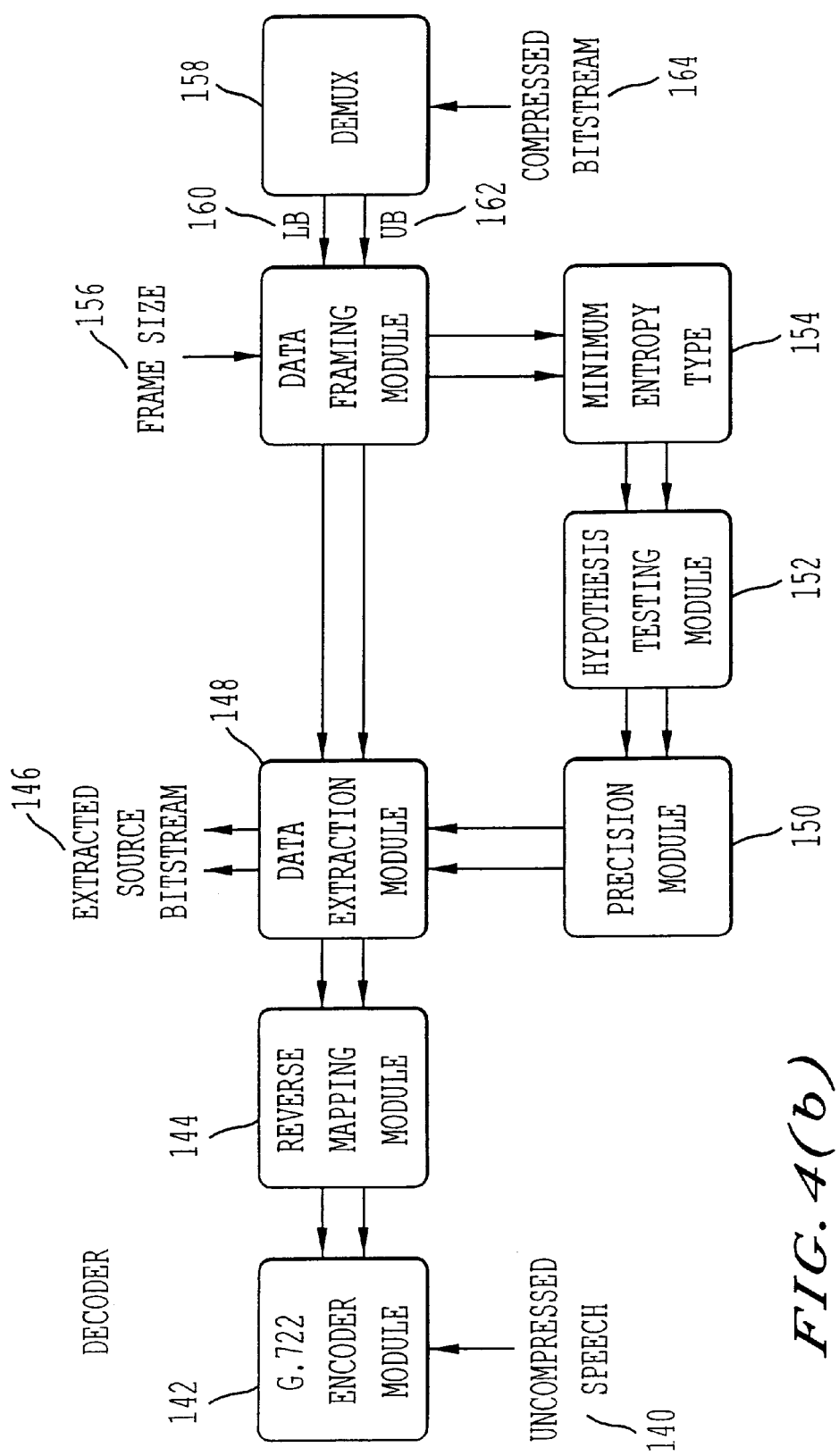
Figure 5A:
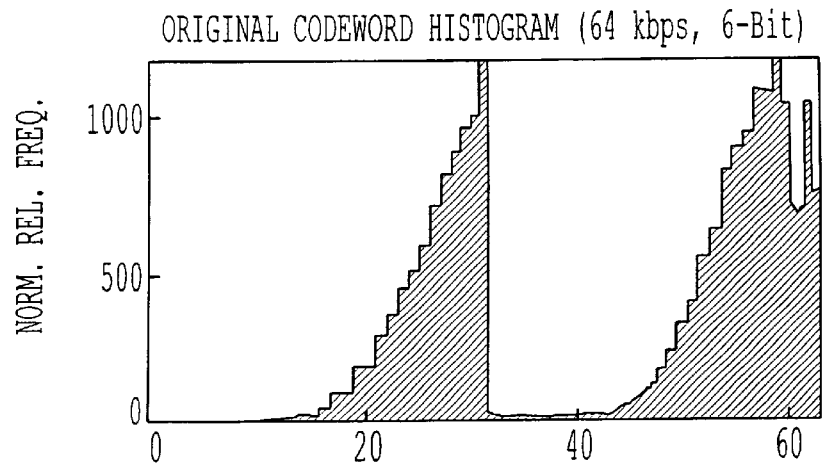
FIGS. 5(a)–5(f) are diagrams of exemplary lower band codewords according to the present invention.
Figure 5C:
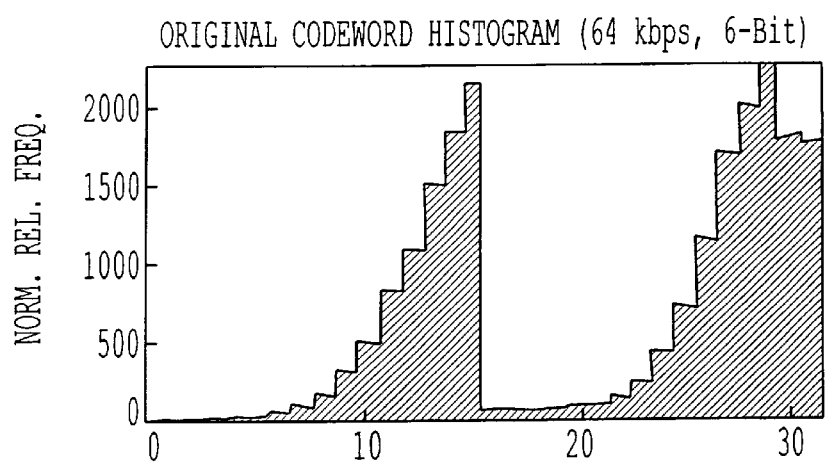
Figure 5E:
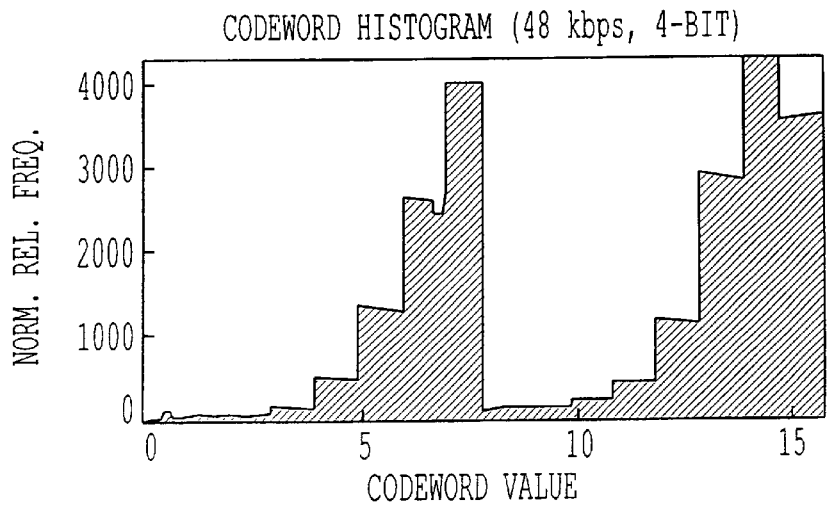
Figure 5B:
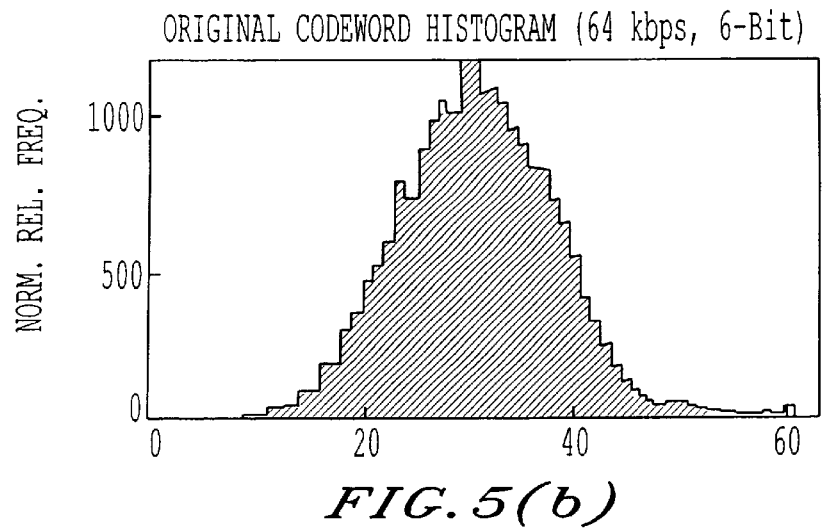
Figure 5D:
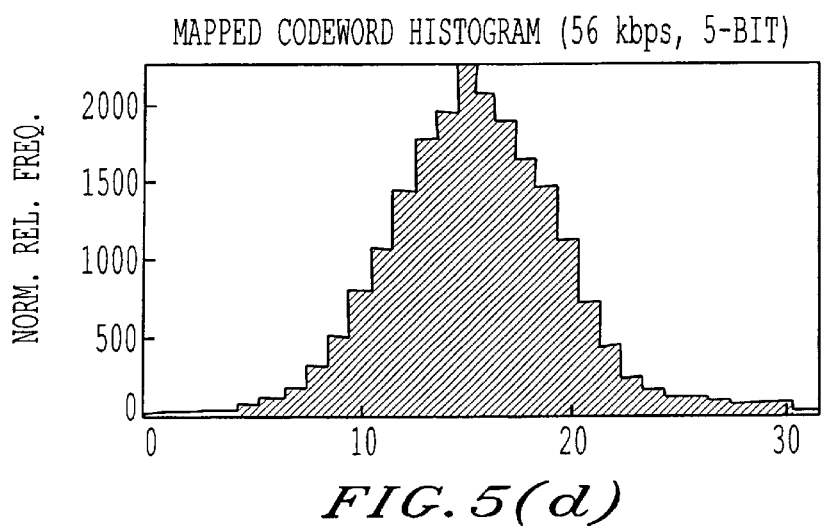
Figure 5F:
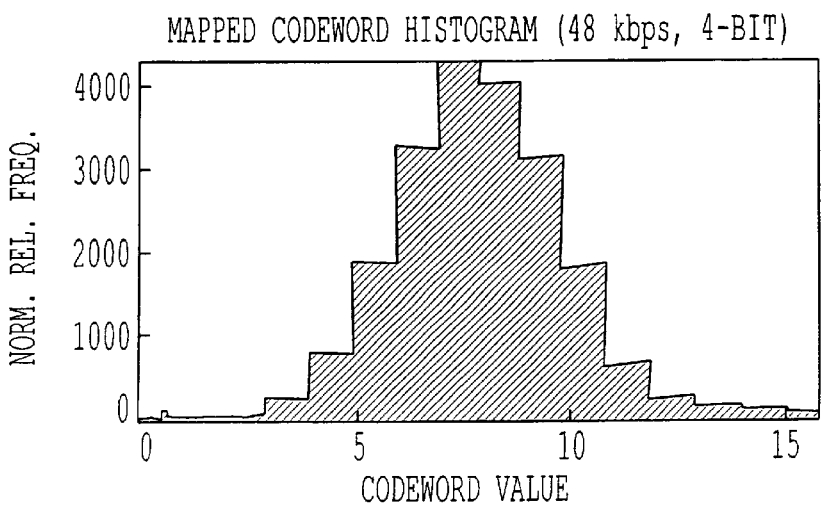
Figure 6A:
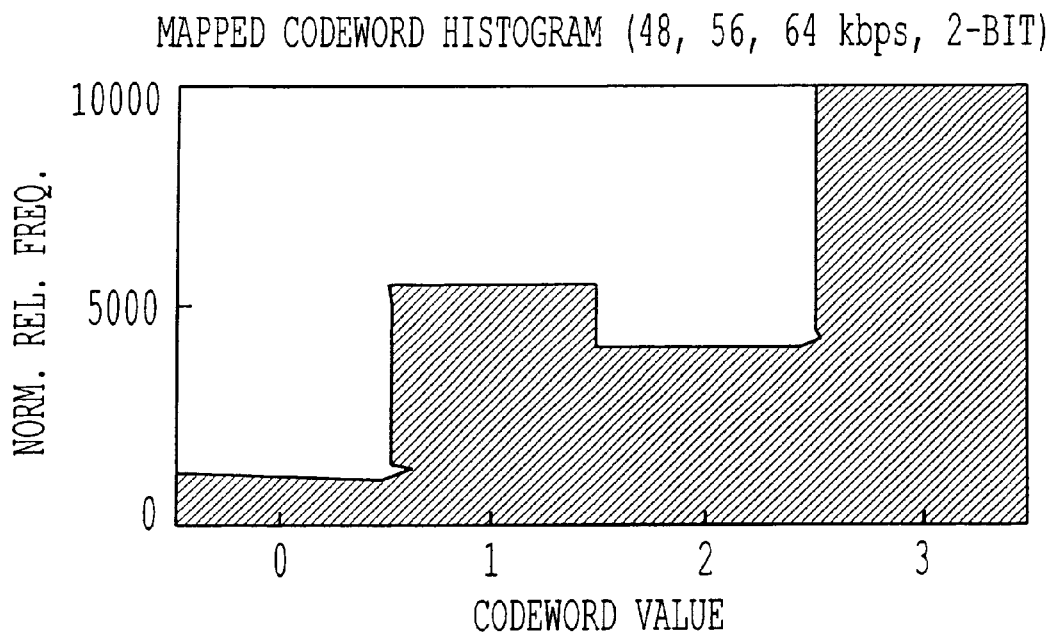
FIGS. 6(a) and 6(b) are diagrams of exemplary upper band codewords according to the present invention.
Figure 6B:
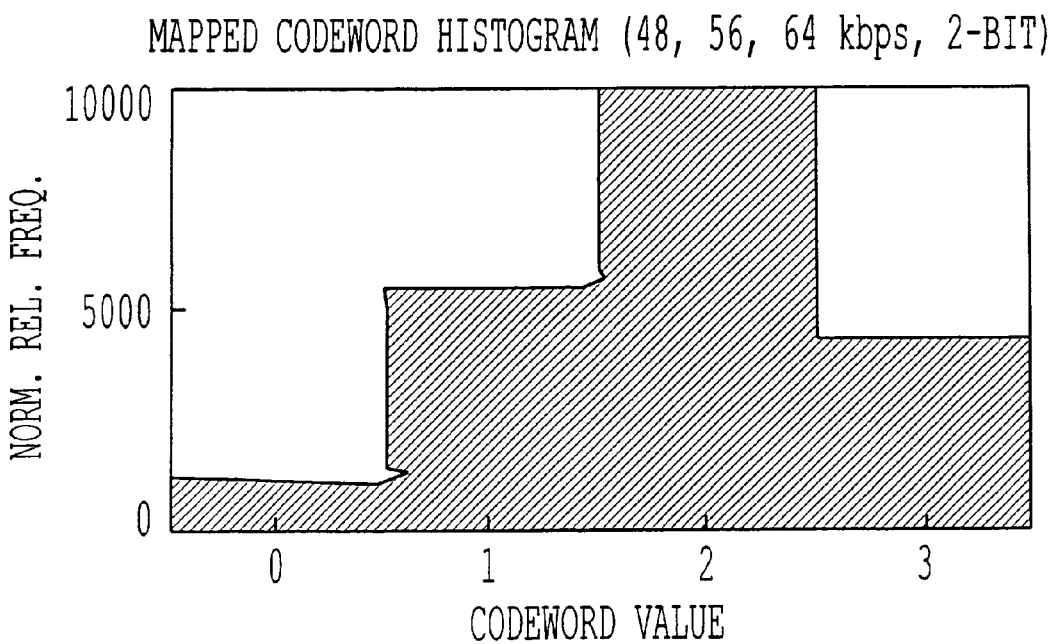

Referring again to the drawings, FIGS. 4(a) and 4(b) are system block diagrams of exemplary embodiments according to the present invention. To begin, the data embedding encoder is described. In the encoder, depicted in FIG. 4(a), a wideband speech signal 106 (i.e. 16 KHz sampling, 256 Kbps) acts as the input to the ITU G.722 module 102. The G.722 module 102 processes the digital input signal using one of three modes of operation (i.e. 48, 56, or 64 Kbps output). Histograms for the lower band G.722 codewords from each of the three modes of operation can be seen in FIGS. 5(a), 5(c), and 5(e). A histogram for the upper band G.722 codewords from all G.722 modes of operation can be seen in FIG. 6(a). Following the compression stage, the data embedding procedure begins. The compressed G.722 codewords are framed by data framing module 112 and mapped in a pre-defined manner. In this case, the mapping function performed by forward mapping module 114 counters the folded binary coding scheme of G.722. The mapping is 1:1 and thus it is completely reversible. In FIGS. 5(b), 5(d), and 5(f), histograms of the mapped G.722 lower band codewords are presented. FIG. 6 (b) shows a histogram of the mapped G.722 upper band codewords.

After mapping, a determination is made of how many bits can be embedded into the lower band and upper band frames independently. This decision is made by the precision module 120. The number of bits embedded in each data frame may change on a frame-by-frame basis. This adaptation is done to counteract adverse statistical properties present in some data frames. It is noted that the encoder and decoder come to comparable conclusions regarding the bit precision of the embedded symbols. Information available to the decoder is used in formulating the number of bits embedded in a frame of data.

To adaptively determine the precision of the embedded symbol, a minimum entropy approach may be used. The encoder forms a minimum entropy type from the current data frame. The minimum entropy type is constructed by minimum entropy type module 116 in the following manner. The original test type is modulated to substantially all possible bin locations and made symmetric. Each time the entropy of the new symmetric type is calculated. Based on the bin number of the minimum entropy symmetric type, the symmetric type is re-centered. The distance from each training type to the centered symmetric type is calculated. Based on the location of the training type closest to the re-centered symmetric type, a value for the offset of the re-centered symmetric type is determined. Using this offset, a penalty constant is derived, and this constant dictates the bit precision to be used for embedding information into the current data frame. In this way, if the penalty value calculated at the encoder is substantial, fewer bits are embedded into the current codeword frame. If the penalty term is small, more bits (i.e. up to log(M)) can be embedded into the current frame. Using such a scheme allows the precision module to be adaptive. This process is also reproducible at the decoder using the received (i.e. embedded) data frame.

Once the precision for the current lower band and upper band frames is determined, the actual data embedding step can occur. After obtaining the bits to be embedded from the secondary source module, the secondary bit sequences are formed into symbols. Based on these symbols and the locations of the current frame's types (i.e. both lower and upper bands), the data frames are modulated (i.e. circularly shifted) in a way corresponding to the embedded data symbols. Modulation in the frame domain corresponds to modulation in the type domain. The modulation is performed based on one of log(M) gridded patterns which corresponds to the embedded precision chosen for each of the current data frames. Note this procedure occurs independently for both the lower and upper data frames. After embedding the secondary symbols, the framed sequences are multiplexed and transmitted over the channel to the decoder. Table III shows results for embedding data into lower and upper bands of G.722 bitstream at 48, 56, and 64 Kbps. At 48, 56, and 64 Kbps, the lower band is coded using 4, 5, and 6 bits/sample. At 48, 56, and 64 Kbps, the upper band is coded using 2 bits/sample. Simulation results are averaged over 10 iterations per sequence using random binary secondary sources in both the lower and upper bands.

An example of the low band encoding/decoding process is summarized in FIGS. 7(a)–7(g). FIGS. 7(a), 7(b), 7(d), and 7(e) represent the encoding process. FIGS. 7(b), 7(c), 7(e), and 7(g) represent the decoding process.

Figure 7C:
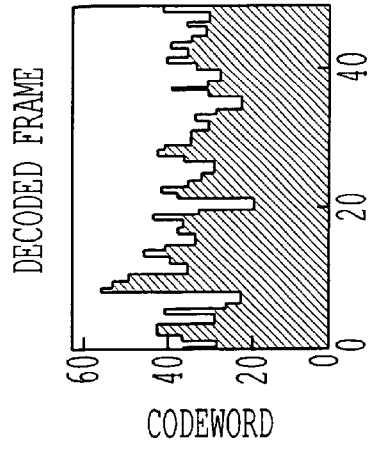
FIGS. 7(a)–7(g) are diagrams of an exemplary encoding/decoding procedure according to the present invention.
Figure 7B:
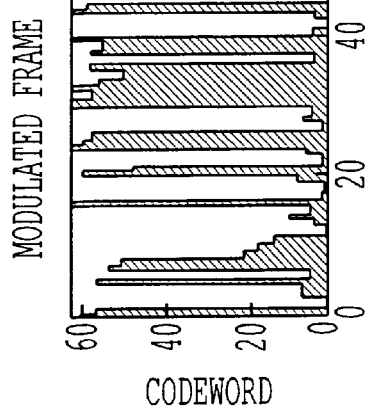
Figure 7A:
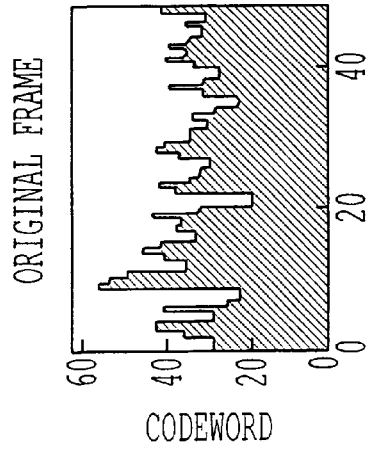
Figure 7F:
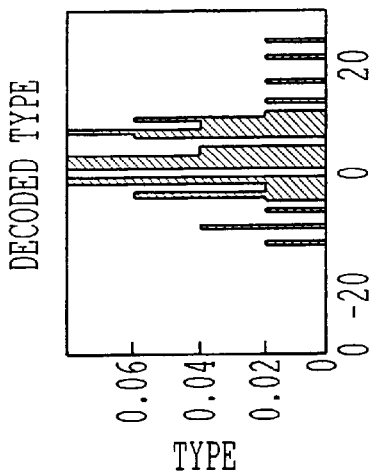
Figure 7E:
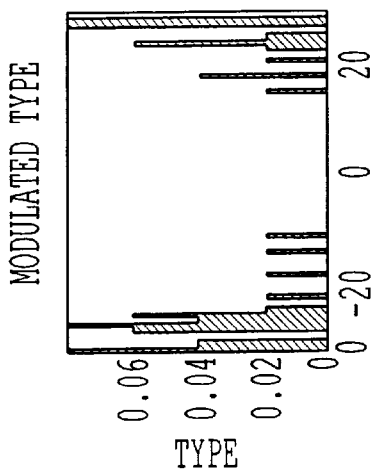
Figure 7D:
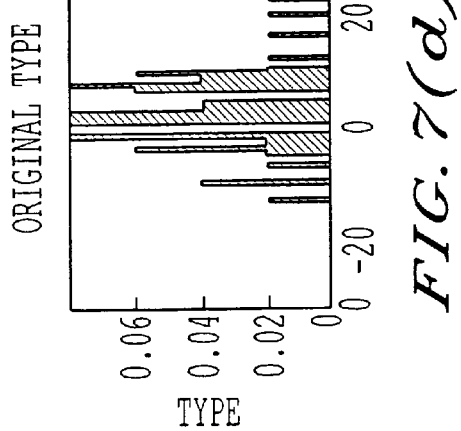
Figure 8:
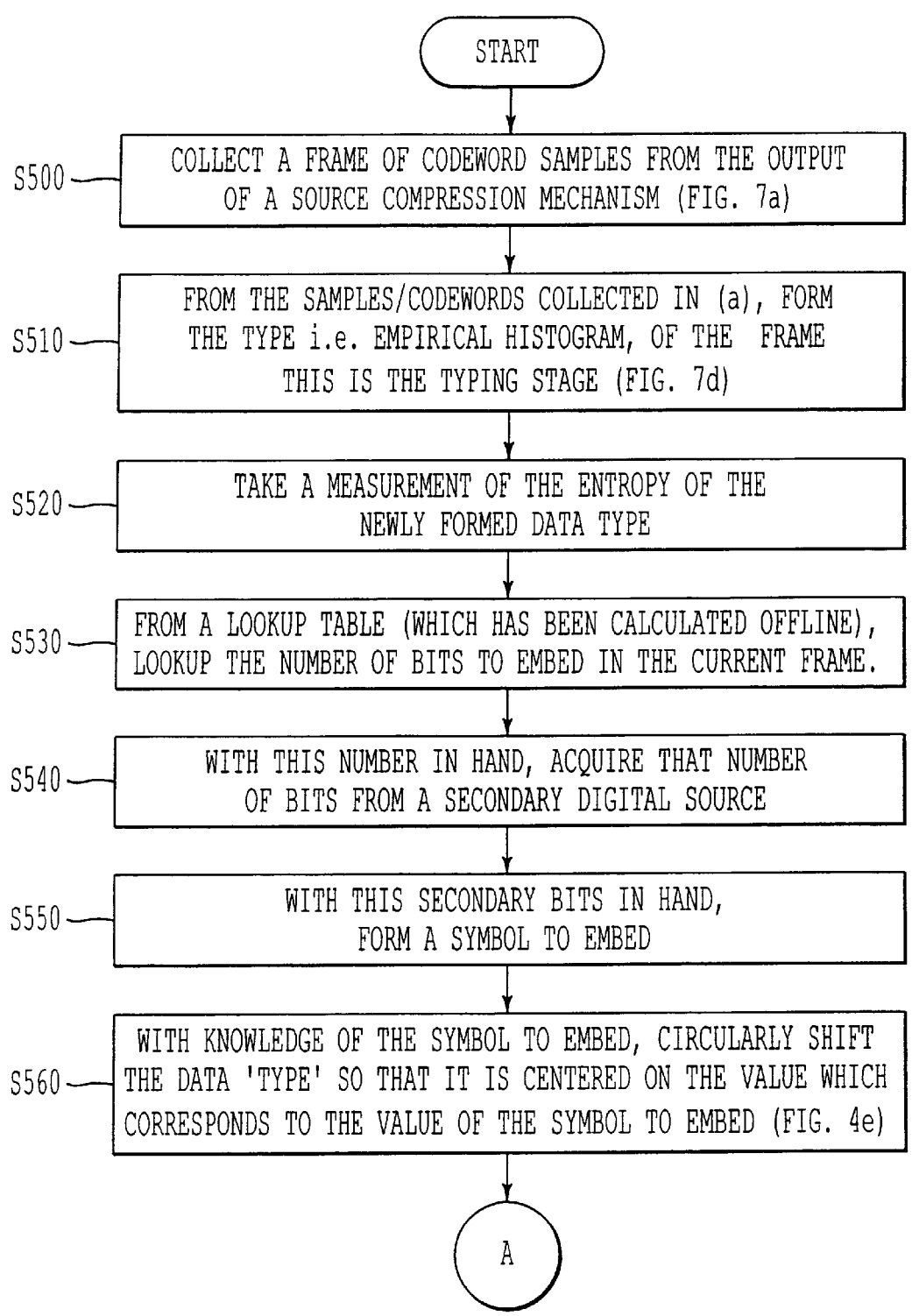
FIG. 8 is a flow chart of an exemplary encoding procedure according to the present invention.

Referring now to FIG. 7(a) and to FIG. 8, step S500, an exemplary frame of codeword samples from the output of a source compression mechanism is collected (for example, in this case, 50 samples of 6-bit, i.e. values 0–63, are used). This is the framing stage, and an assumption at this point in this example is that the data samples may have been re-mapped in a prior stage to compensate for any other effects. For example, correction for folded binary codes in the source compression bitstream may be desirable. A non-limiting feature of the re-mapping strategy is to force the 'type' in the next stage, i.e. illustrated in FIG. 7(d), to be unimodal and symmetric. In other examples, the type may be different.

Referring to FIG. 7(d), from the samples/codewords collected as in FIG. 7(a), the 'type', i.e. exemplary empirical histogram, of the frame is formed. This is the typing stage, as shown in FIG. 8, step S510.

Referring to FIG. 8, at this point, a measurement is taken (step S520) of the entropy of the newly formed data 'type' and from a lookup table, for example, (which may have been calculated offline), the number of bits to embed in the current frame is looked up in step S530. With this number

TABLE III

| Speech Sequence | Lower Band Simulations Bit Errors/Embedded Bits | | | | | | Upper Band Simulations Bit Errors/Embedded Bits | | |
|---|---|---|---|---|---|---|---|---|---|
| (M)ale | 48 Kbps | | 56 Kbps | | 64 Kbps | | 48/56/64 Kbps | | |
| (F)emale | 240 bps | 315 bps | 400 bps | 530 bps | 560 bps | 740 bps | 200 bps | 300 bps | 500 bps |
| 01 (M) | 0/640 | 0/825 | 1/1051 | 2/1471 | 2/1473 | 3/1961 | 0/531 | 1/785 | 18/1320 |
| 02 (M) | 2/720 | 1/998 | 1/1258 | 3/1650 | 2/1750 | 5/2309 | 0/624 | 3/925 | 9/1560 |
| 03 (M) | 0/673 | 1/919 | 0/1132 | 1/1515 | 1/1601 | 0/2052 | 0/570 | 2/845 | 27/1425 |
| 04 (M) | 0/555 | 0/712 | 0/914 | 0/1203 | 0/1251 | 0/1611 | 0/456 | 1/675 | 17/1140 |
| 05 (M) | 0/543 | 0/699 | 0/898 | 0/1200 | 0/1242 | 0/1633 | 0/453 | 0/670 | 9/1125 |
| 06 (F) | 0/561 | 0/1073 | 0/1352 | 1/1775 | 1/1971 | 2/2479 | 0/678 | 7/1005 | 61/1695 |
| 07 (F) | 0/541 | 0/705 | 1/900 | 0/1181 | 0/1211 | 0/1660 | 1/450 | 4/665 | 35/1125 |
| 08 (F) | 1/697 | 2/894 | 1/1140 | 1/1513 | 0/1571 | 1/2118 | 1/570 | 9/845 | 58/1425 |
| 09 (F) | 1/711 | 4/951 | 2/1211 | 5/1597 | 3/1697 | 11/2223 | 1/603 | 5/895 | 36/1500 |
| 10 (F) | 1/601 | 3/793 | 3/1001 | 7/1297 | 6/1421 | 14/1895 | 4/507 | 3/750 | 46/1260 |
| Totals | 5/6242 | 11/8569 | 9/10857 | 20/14402 | 15/15188 | 36/19941 | 7/5442 | 35/8060 | 316/13575 |
| % Error | 0.08 | 0.13 | 0.08 | 0.14 | 0.10 | 0.18 | 0.13 | 0.43 | 2.33 |

The decoder can be seen in FIG. 4(b). Similar to the encoder, the decoder buffers the lower band and upper band frames and uses the minimum entropy approach discussed above to adaptively determine the number of bits embedded within the current frame. The decoder uses only the received data frame to determine the embedded bit precision. Because the procedure used to determine the embedded bit precision is shift (i.e. modulation) tolerant, the decoder comes to the same conclusion as the encoder. Up to the decision regarding the embedded bit precision, the decoder is substantially like the encoder. The difference between the two lie in the data extraction procedure. Using the embedded precision surmised from the encoded frames and knowledge of the grid system in place for all possible embedded bit precisions, the data extraction module performs a hypothesis testing process to determine the embedded symbol contained within the current data frame. With knowledge of the embedded symbol and the embedded bit precision, the decoder demodulates the received data frame to recover the contents of the mapped data frame.

in hand, that number of bits from the secondary digital source is acquired S540. Now, with these secondary bits in hand, a symbol is formed to embed S550.

Referring to FIG. 7(e) and to FIG. 8, step S560, with knowledge of the symbol to embed, the data 'type' is circularly shifted so that it is centered on the value which corresponds to the value of the symbol to embed. This example assumes that a grid system exists corresponding to the number of possible locations (i.e. 2^[number of embedded bits]) that the data 'type' can be shifted in order to embed data. This example grid system is already set up when the table lookup in the previous stage is performed.

Referring to FIG. 7(e), an exemplary representation of the circularly shifted 'type' in the sample domain is depicted. This type represents the values that are transmitted to the decoder/detector side.

Figure 7G:
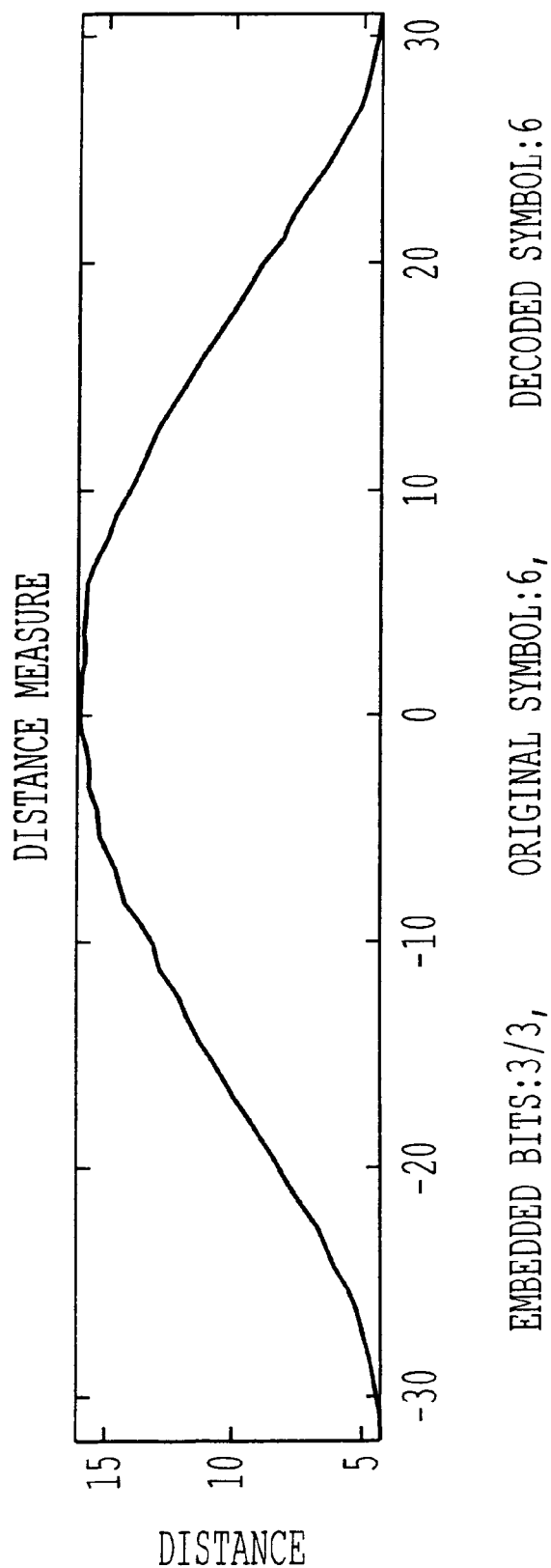
Figure 9:
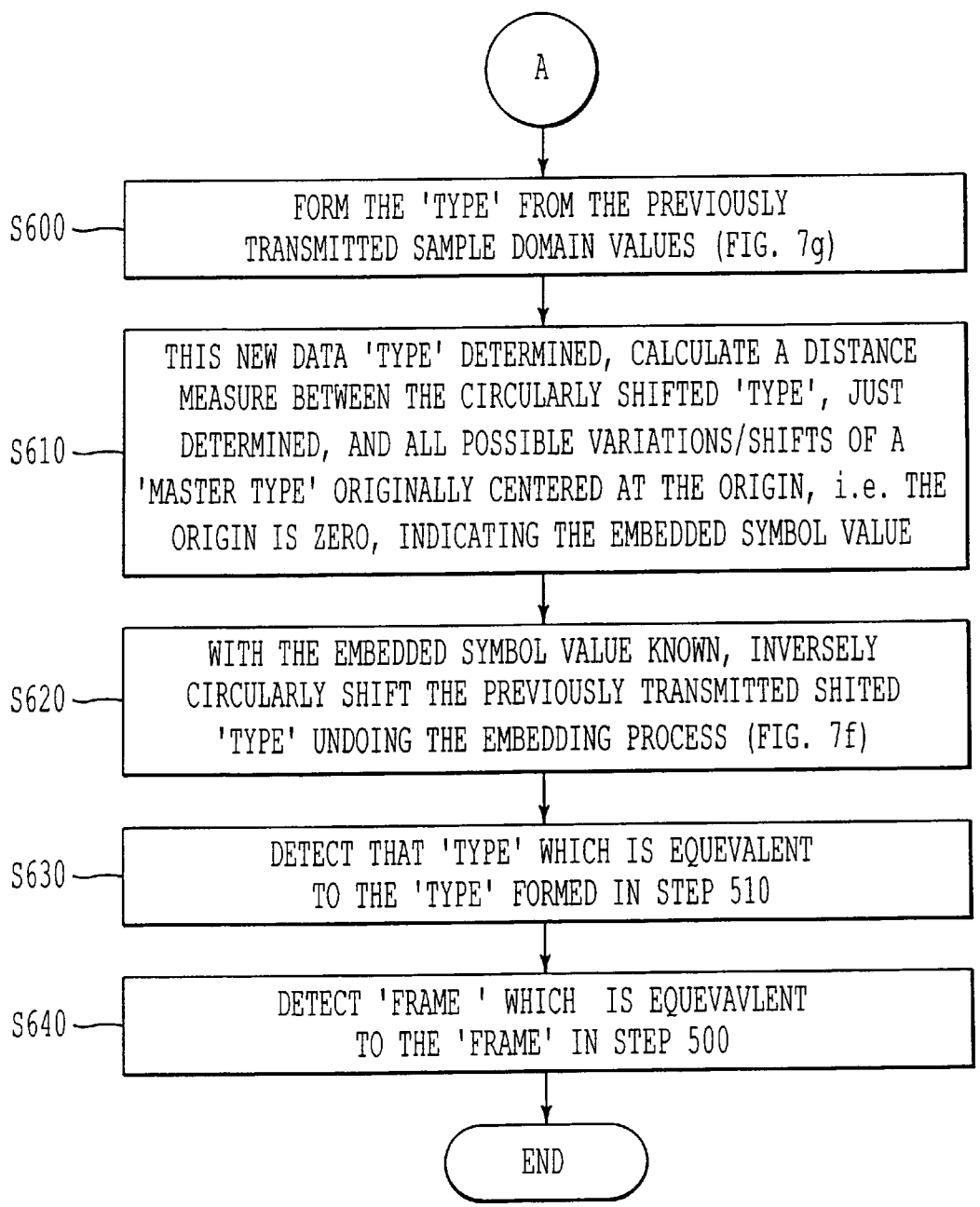
FIG. 9 is a flow chart of an exemplary decoding procedure according to the present invention.

Referring to FIG. 7(g) and FIG. 9, now featuring the exemplary decoder side, the 'type' from the previously transmitted sample domain values may now be formed in step S600. With this new data 'type' determined, a distance measure is calculated between the circularly shifted 'type', which was just determined, and substantially all possible variations/shifts of a 'master type' originally centered at the origin, i.e. the origin is zero in step S610. In essence, this will reveal the location of the shifted type on the example grid, or, equivalently, the embedded symbol value.

Referring to FIG. 7(f) and to FIG. 9, step S620, with the embedded symbol value known, the previously transmitted shifted 'type' can be inversely circular shifted. This then undoes the embedding process. The result, if the correct detection has occurred, will be that 'type' which is equivalent to the 'type' formed as in FIG. 7(d).

Referring to FIG. 7(c) and FIG. 9, this is the representation of the inversely circularly shifted 'type' in the sample domain of step S630. These are the samples that correspond to the original data that was to be sent. The result, if the correct detection has occurred in step S640, will be that 'frame' which is equivalent to the 'frame' shown as in FIG. 7(a).

With the embedded symbol and mapped data frame secure, the decoder reverse maps the lower and upper codeword frames and buffers each until enough samples are present to transmit to the G.722 decoder.

Numerous results from wideband speech processing trials conducted by the present inventors are presented in Table III. Table III is split into two independent portions, lower band simulations and upper band simulations. This is done to demonstrate the independence of the embedding process between the two bands. In the lower band simulations, two embedded bitrates are examined within the confines of each operational mode of G.722 (i.e. 48, 56, and 64 Kbps output). For each input sequence (i.e. 1–10), the average number of embedded bit errors incurred and the average number of bits embedded during 10 trials over that sequence are shown. From this information, the average embedded bit error rate is calculated and displayed in terms of percent error for each output bitrate and corresponding operational mode. In the upper band, three embedded bitrates are examined. These simulated results are valid for all of the operational modes of G.722 since in each mode two bits per sample is used to compress the upper band.

Because the two bands are addressed independently, the embedding capacity of novel data embedding procedure of the present invention can be appreciated by combining any one result from the lower band simulations with any one result from the upper band simulations. The tradeoff demonstrated by these results is that of embedded rate versus error probability in the host bitstream. The desired combined embedding rate and pre-determined error probability, or vice versa, can be chosen.

Accordingly, the mechanisms and processes set forth in the present description may be implemented using a conventional general purpose microprocessor, digital signal processor (DSP), or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor, DSP, or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous modifications and variations of the present invention are possible in light of the above teachings. It is therefore to be understood that within the scope of the appended claims, the invention may be practiced otherwise than as specifically described herein.

APPENDIX

References

1. ITU, "Recommendation G.722: 7 KHz Audio-Coding Within 64 Kbits/sec," November, 1988.
2. T. Cover and J. Thomas, *Elements of Information Theory*, John Wiley & Sons, Inc., New York, 1991.
3. I. Csiszar, "The Method of Types," *IEEE Transactions on Information Theory*, Vol. 44, No. 6, pp. 2505–2523, October, 1998.
4. Mark G. Kokes and Jerry D. Gibson, "The Method of Types and Lossy Data Embedding," *IEEE Signal Processing Society's Ninth Digital Signal Processing Workshop*, October, 2000.
5. Mark G. Kokes, Victor J. Stolpman, Geoffrey C. Orsak, and Jerry D. Gibson, "Embedding Information in Digital Representations of Signals," *Fifth Biennial World Conference on Integrated Design and Process Technology*, June, 2000.
6. P. Bassia and I. Pitas, "Robust Audio Watermarking in the Time Domain," *Proceedings of the IX European Signal Processing Conference*, Vol. I, pp. 25–28, September, 1998.
7. M. Cooperman and S. Moskowitz, "Steganographic Method and Device," U.S. Pat. No. 5,613,004, 1997.
8. W. Bender, et al, "Techniques for Data Hiding," *IBM Systems Journal*, Vol. 35, No. 3&4, pp. 313–336.
9. R. Pruess, et al, "Embedded Signaling," U.S. Pat. No. 5,319,735, 1994.
10. C. Lee, K. Moallemi, and R. Warren, "Method and Apparatus for Transporting Auxiliary Data in Audio Signals," U.S. Pat. No. 5,822,360, 1998.
11. D. Moses, "Simultaneous Transmission of Data and Audio Signals by Means of Perceptual Coding," U.S. Pat. No. 5,473,631, 1995.
12. M. Swanson, et al, "Robust Audio Watermarking Using Perceptual Masking," *IEEE Signal Processing Magazine*, Vol. 66, No. 3, pp. 337–355, May, 1998.
13. M. Swanson, et al, "Current State of the Art and Future Directions for Audio Marking," *IEEE International Conference on Multimedia Computing and Systems*, Vol. 1, pp. 19–24, 1999.
14. J. Tilki and A. Beex, "Encoding a Hidden Digital Signature onto an Audio Signal Using Psychoacoustic Masking," *Proceedings of the Seventh International Conference on Signal Processing Applications and Technology*, pp. 476–480, 1996.
15. J. Wolosewicz, "Apparatus and Method for Encoding and Decoding Information in Audio Signals," U.S. Pat. No. 5,774,452, 1998.
16. J. Woloeswicz and K. Jemeli, "Apparatus and Method for Encoding and Decoding Information in Analog Signals," U.S. Pat. No. 5,828,325, 1998.

17. N. Warke, "Adaptive Signal Classification Using Information Theoretic Techniques," *Ph.D. Thesis*, George Mason University, December, 1997.
18. J. Ziv, "On Classification With Empirically Observed Statistics and Universal Data Compression," *IEEE Transactions on Information Theory*, Vol. IT-34, pp. 278–286, March, 1988.
19. M. Gutman, "Asymptotically Optimal Classification for Multiple Tests With Empirically Observed Statistics," *IEEE Transactions on Information Theory*, Vol. IT-35, pp. 401–408, March, 1989.
20. V. Poor, *An Introduction to Signal Detection and Estimation*, New-York: Springer-Verlag, 1988.
21. V. Stolpman and G. Orsak, "Type-Based Receiver for Wideband CDMA," *Proceedings of the IEEE*
22. S. Katzenbeisser and F. Petitcolas, eds., *Information Hiding: Techniques for Steganography and Digital Watermarking*, Artech House, Boston, 2000.
23. S. Paranjpe, V. Stolpman, and G. Orsak, "A Training Free Empirical Receiver For QAM Signals," *Proc. of IEEE Wireless Comm. and Networking Conf.*, pp. 221–225, September, 1999.
24. V. Stolpman, S. Paranjpe, and G. Orsak, "A Blind Information Theoretic Approach To Automatic Signal Classification," Proc. of MILCOM, pp. 447–451, November, 1999.
25. ITU-T G.711, "Pulse Code Modulation (PCM) of Voice Frequencies,", November, 1988.
26. M. Kokes and J. Gibson, "The Method of Types and Lossy Data Embedding," *IEEE DSP Workshop*, October, 2000.
27. M. Kokes, et al, "Embedding Information Into Digital Representations of Signals," *Fifth World Conference on Integrated Design and Process Technology*, June, 2000.
28. O. Zeitouni, J. Ziv, and N. Merhav, "When is the Generalized Liklihood Ratio Test Optimal?," *IEEE Trans. Inform. Theory*, vol. 38, no. 5, pp. 1597–1602, September, 1992.
29. J. Ziv and N. Merhav, "A Measure of Relative Entropy Between Individual Sequences with Application to Universal Classification," IEEE Trans. Inform. Theory, vol. 39, no. 4, pp. 1270–1279, July, 1993.

We claim:

1. An embedded data encoder comprising:
    a data precision module configured to determine a number of bits to embed in a data frame; and
    a data-embedding module coupled to said data precision module and configured to receive a secondary data input and to modulate said data frame according to a secondary data symbol and a secondary data precision.
2. The embedded data encoder according to claim 1, further including a universal classifier.
3. The embedded data encoder according to claim 1, wherein the data precision module is adaptive.
4. The embedded data encoder according to claim 1, wherein the embedded data includes at least one of e-mail data, video data, wireless data, control data, file-transfer data, quality-enhancement data, and storage data.
5. The embedded data encoder according to claim 1, wherein the embedded data is associated with a key.
6. The embedded data encoder according to claim 1, wherein the data precision module is configured for at least one of maximizing the embedded data, minimizing data errors, and adaptively embedding maximum data subject to a limit on lost data errors.
7. The embedded data encoder according to claim 1, wherein the data embedding module is configured for at least one of modulation by circular shifting and modulation according to an identified data type.
8. The embedded data encoder according to claim 2, wherein the universal classifier is configured for the method of types.
9. A embedded data decoder comprising:
    a data precision module configured to determine a number of bits embedded in a data frame; and
    a data extraction module coupled to said data precision module and configured to produce a secondary data output and to demodulate said data frame according to a secondary data symbol and a secondary data precision, wherein said secondary data symbol is determined by M-ary hypothesis testing of said data frame.
10. The embedded data decoder according to claim 9, further including a universal classifier.
11. The embedded data decoder according to claim 9, wherein the data precision module is adaptive.
12. The embedded data decoder according to claim 9, wherein the embedded data includes at least one of e-mail data, video data, wireless data, control data, file-transfer data, quality-enhancement data, and storage data.
13. The embedded data decoder according to claim 9, wherein the embedded data is associated with a key.
14. The embedded data decoder according to claim 9, wherein the data precision module is configured for at least one of maximizing the embedded data, minimizing data errors, and adaptively embedding maximum data subject to a limit on lost data errors.
15. The embedded data decoder according to claim 9, wherein the data embedding module is configured for at least one of modulation by circular shifting and modulation according to an identified data type.
16. The embedded data decoder according to claim 10, wherein the universal classifier is configured for the method of types.
17. A system comprising:
    a framing module configured to receive data input;
    a mapping module coupled to said framing module;
    an entropy module coupled to said mapping module;
    a hypothesis testing module coupled to said entropy module;
    a precision module coupled to said hypothesis testing module; and
    a data-embedding module coupled to said precision module and said mapping module and configured to receive secondary data input.
    a data-extracting module coupled to said precision module and said mapping module and configured to output secondary data output.
18. The system according to claim 17, further including a universal classifier.
19. The system according to claim 17, wherein the data precision module is adaptive.
20. The system according to claim 17, wherein the embedded data includes at least one of e-mail data, video data, wireless data, control data, file-transfer data, quality-enhancement data, and storage data.
21. The system according to claim 17, wherein the embedded data is associated with a key.
22. The system according to claim 17, wherein the data precision module is configured for at least one of maximizing the embedded data, minimizing data errors, and adaptively embedding maximum data subject to a limit on lost data error.

23. The system according to claim 17, wherein the data embedding module is configured for at least one of modulation by circular shifting or modulation according to an identified data type.

24. The system according to claim 18, wherein the universal classifier is configured for the method of types.

25. A method for data embedding, comprising the steps of:
   (1) framing input codewords;
   (2) mapping framed codewords into base master types;
   (3) determining a number of bits that can be embedded into a frame;
   (4) forming secondary bit sequences into embedded data symbols; and
   (5) modulating a frame based on the embedded data symbols and a current frame type.

26. The method according to claim 25, further comprising the step of universal classification.

27. The method according to claim 25, wherein said step of determining a number of bits that can be embedded is adaptive.

28. The method according to claim 25, further comprising the step of transmitting at least one of e-mail data, video data, wireless data, control data, file-transfer data, quality-enhancement data, and storage data.

29. The method according to claim 25, wherein at least one of steps (1)–(5) is associated with a key.

30. The method according to claim 25, wherein said step of determining a number of bits that can be embedded comprises at least one of maximizing the embedded data, minimizing data errors, and adaptively embedding maximum data subject to a limit on lost data errors.

31. The method according to claim 25, further comprising at least one of the steps of modulation by circular shifting and modulation according to an identified data type.

32. The method according to claim 26, wherein said step of universal classification comprises the method of types.

33. A method for extracting embedded data, comprising the steps of:
   (1) framing input (received) codewords;
   (2) determining a number of bits that are embedded into a frame;
   (3) demodulating a frame based on the embedded data symbols and a current frame type;
   (4) reverse mapping base master types into framed codewords; and
   (5) forming embedded data symbols into secondary bit sequences.

34. The method according to claim 33, further comprising the step of universal classification.

35. The method according to claim 33, wherein said step of determining a number of bits that can be extracted is adaptive.

36. The method according to claim 33, further comprising the step of receiving at least one of e-mail data, video data, wireless data, control data, file-transfer data, quality-enhancement data, and storage data.

37. The method according to claim 33, wherein at least one of steps (1)–(5) is associated with a key.

38. The method according to claim 33, wherein said step of determining a number of bits that can be extracted comprises at least one of maximizing the embedded data, minimizing data errors, and adaptively extracting maximum data subject to a limit on lost data errors.

39. The method according to claim 33, further comprising at least one of the steps of modulation by circular shifting and modulation according to an identified data type.

40. The method according to claim 34, wherein said step of universal classification comprises the method of types.

41. A computer program product comprising:
   computer storage media containing computer executable instructions stored therein, wherein said computer executable instructions, when executed by a computer, implement the method of at least one of claims 25–40.

* * * * *